(12) United States Patent
Yu et al.

(10) Patent No.: US 11,212,863 B2
(45) Date of Patent: Dec. 28, 2021

(54) DUAL CONNECTION COMMUNICATION METHOD IN WIRELESS NETWORK, APPARATUS, AND SYSTEM

(71) Applicant: HUAWEI TECHNOLOGIES CO., LTD., Guangdong (CN)

(72) Inventors: Haifeng Yu, Beijing (CN); Xin Xiong, Beijing (CN); Feng Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/579,506

(22) Filed: Sep. 23, 2019

(65) Prior Publication Data

US 2020/0022207 A1 Jan. 16, 2020

Related U.S. Application Data

(63) Continuation of application No. PCT/CN2018/079871, filed on Mar. 21, 2018.

(30) Foreign Application Priority Data

Mar. 24, 2017 (CN) .......................... 201710184934.9

(51) Int. Cl.
*H04W 76/25* (2018.01)
*H04W 76/15* (2018.01)
(Continued)

(52) U.S. Cl.
CPC ........... *H04W 76/25* (2018.02); *H04W 76/15* (2018.02); *H04W 84/045* (2013.01); *H04W 88/02* (2013.01)

(58) Field of Classification Search
CPC ... H04W 76/25; H04W 76/15; H04W 84/045; H04W 88/02
See application file for complete search history.

(56) References Cited

U.S. PATENT DOCUMENTS

2014/0056243 A1 2/2014 Pelletier et al.
2014/0293896 A1 10/2014 Kuo
(Continued)

FOREIGN PATENT DOCUMENTS

CN 104219787 A 12/2014
CN 104584633 A 4/2015
(Continued)

OTHER PUBLICATIONS

R2-081523—Ericsson, "Default configuration for SRB0 and SRB1 at RRC connection establishment," 3GPP TSG-RAN WG2 #61bis, Shenzhen, China, Mar. 31-Apr. 4, 2008, 5 pages.
(Continued)

*Primary Examiner* — Ricky Q Ngo
*Assistant Examiner* — Stephen N Steiner
(74) *Attorney, Agent, or Firm* — Fish & Richardson P.C.

(57) ABSTRACT

Example communication methods and apparatus in a wireless network are described. One example communication method includes establishing dual connections to a first access network device and a second access network device by a terminal device. A connection that is between the terminal device and the first access network device and that is included in the dual connections is a radio resource control (RRC) connection. The terminal device receives first configuration information sent by the first access network device. The first configuration information includes signaling radio bearer (SRB) configuration information of the second access network device and a trigger condition for using the SRB configuration information. When the trigger condition is met, the terminal device uses the SRB configuration information of the second access network device to establish an RRC connection to the second access network device.

18 Claims, 7 Drawing Sheets

(51) Int. Cl.
*H04W 84/04* (2009.01)
*H04W 88/02* (2009.01)

(56) References Cited

U.S. PATENT DOCUMENTS

| | | |
|---|---|---|
| 2015/0117183 A1 | 4/2015 | Heo et al. |
| 2015/0230134 A1 | 8/2015 | Chiba et al. |
| 2016/0057658 A1* | 2/2016 | Horn .................. H04L 47/743 370/236 |
| 2016/0285716 A1* | 9/2016 | Pelletier .............. H04L 43/0811 |
| 2016/0338138 A1 | 11/2016 | Pelletier et al. |
| 2017/0019945 A1* | 1/2017 | Chiba ................... H04W 76/15 |
| 2017/0171903 A1* | 6/2017 | Kubota ............... H04L 41/0672 |
| 2017/0208488 A1* | 7/2017 | Hwang ............... H04W 64/003 |
| 2018/0007583 A1 | 1/2018 | Hong et al. |

FOREIGN PATENT DOCUMENTS

| | | |
|---|---|---|
| CN | 104684104 A | 6/2015 |
| CN | 106165488 A | 11/2016 |
| WO | 2015176738 A1 | 11/2015 |
| WO | 2016045625 A2 | 3/2016 |
| WO | 2016182670 A1 | 11/2016 |

OTHER PUBLICATIONS

R2-1700279—ZTE et al., "Consideration on the intra-NR Dual connectivity and Multiple-Connectivity," 3GPP TSG-RAN NR ad hoc, Spokane, USA, Jan. 17-19, 2017, 4 pages.
PCT International Search Report and Written Opinion issued in International Application No. PCT/CN2018/079871 dated May 29, 2018, 20 pages (with English translation).
Office Action issued in Chinese Application No. 201710184934.9 dated Feb. 3, 2020, 23 pages (With English Translation).
Extended European Search Report issued in European Application No. 18771939.8 dated Jan. 2, 2020, 13 pages.
EPO Communication pursuant to Article 94(3) EOC issued in European Application No. 18771939.8 dated Jul. 29, 2021, 8 pages.

* cited by examiner

DUAL CONNECTION COMMUNICATION METHOD IN WIRELESS NETWORK, APPARATUS, AND SYSTEM

CROSS-REFERENCE TO RELATED APPLICATIONS

This application is a continuation of International Application No. PCT/CN2018/079871, filed on Mar. 21, 2018, which claims priority to Chinese Patent Application No. 201710184934.9, filed on Mar. 24, 2017. The disclosures of the aforementioned applications are hereby incorporated by reference in their entireties.

TECHNICAL FIELD

This application relates to the field of communications technologies, and specifically, to a communication method in a wireless network, an apparatus, and a system.

BACKGROUND

In 4th generation (4G) mobile communications, reliability of a radio resource control (RRC) connection is a basis of ensuring information exchange between a control plane and a user plane. A problem of a radio link causes RRC connection unreliability, affecting communication quality. To ensure RRC connection reliability, a dual connectivity (DC) architecture is introduced into 4G mobile communications. Using a long term evolution (LTE) system as an example, in a DC architecture, a terminal device may establish communication connections to both a master access network device (for example, a master eNodeB MeNB (Master eNB)) and a secondary access network device (for example, a secondary eNodeB SeNB (Secondary eNB)). The master access network device is responsible for mobility management and data packet offloading of the terminal device. The secondary access network device is configured to help the master access network device undertake some data services. In the existing dual connectivity architecture, the terminal device can support only one RRC state. To be specific, the terminal device can establish an RRC connection to only one access network device while maintaining a communication connection to the other access network device. The communication connection is a non-RRC connection. The master access network device usually needs to exchange control signaling and data with the terminal device, and therefore the terminal device establishes an RRC connection to the master access network device. The secondary access network device exchanges only data with the terminal device, and therefore the secondary access network device maintains a communication connection to the terminal device.

As 4G mobile wireless communications enters a phase of large-scale commercial use, future-oriented 5th generation (5G) mobile communications has become a popular issue of global research and development. One type of application scenario in 5G mobile communications is ultra-reliable and low-latency communications (URLLC). URLLC services have an extremely strict requirement on a latency for a user plane and a control plane. In 3GPP TR 38.913, latency requirements are described as follows:

a target latency on a control plane is 10 ms;
on a user plane, a target latency is 0.5 ms in uplink and 0.5 ms in downlink; and
a target interruption latency is 0 ms during movement.

From the foregoing descriptions, it can be learned that URLLC services usually require data to be transmitted as soon as possible once the data is generated. RRC connection unreliability may cause data transmission interruption, resulting in an interruption latency. In addition, some URLLC services need to use high-frequency communication. In high-frequency communication, a channel fades quickly. Consequently, for such services, RRC connection unreliability caused by a problem of a radio link is worse due to impact of a high frequency.

In 5G communications, the foregoing dual connectivity architecture is still used to ensure better communication quality. However, a problem of the existing dual connectivity architecture is: A terminal device maintains an RRC connection only to a master access network device; when a radio link failure (RLF) occurs between the terminal device and the master access network device, the master access network device cannot continue to perform mobility management and data packet offloading of the terminal device, and because there is no RRC connection between a secondary access network device and the terminal device, the secondary access network device cannot complete the foregoing work, either. As a result, once an RLF occurs on the master access network device, it is deemed that an RLF occurs on both of dual connections. In this case, neither of the master access network device and the secondary access network device can provide a service for the terminal device. To restore a normal dual-connectivity working mode, the terminal device needs to search for a new master access network device to re-establish an RRC connection, and re-add the secondary access network device or change the secondary access network device.

However, data transmission is interrupted temporarily during RRC connection re-establishment between the terminal device and the master access network device. This causes a data interruption latency, which is undesirable for a URLLC service. In addition, addition or change of a secondary access network device needs to be completed through a process of RRC connection re-establishment, and consequently, a time of dual connectivity architecture restoration is prolonged. This is unfavorable for implementation of target performance of a URLLC service. Therefore, a latency brought by an existing dual-connection restoration process cannot meet a requirement of a 5G mobile communications service, in particular, a low-latency requirement of a URLLC service.

SUMMARY

Embodiments of the present invention provide a communication method in a wireless network, an apparatus, and a system, to establish an RRC connection to a secondary access network device when quality of a radio link between a terminal device and a master access network device is relatively poor, and speed up restoration of a dual-connectivity working mode while maintaining data transmission, thereby meeting a low-latency requirement.

According to an aspect, an embodiment of the present invention provides a communication method in a wireless network. The method includes: establishing, by a terminal device, dual connections to a first access network device and a second access network device, where a connection, between the terminal device and the first access network device, included in the dual connections is an RRC connection; receiving, by the terminal device, first configuration information sent by the first access network device, where the first configuration information includes signaling radio bearer SRB configuration information of the second access network device and a trigger condition for using the SRB configuration information, and when the trigger condition is met, using, by the terminal device, the SRB configuration information of the second access network device to establish an RRC connection to the second access network device. According to the method provided in this embodiment, when the trigger condition is met, the terminal device uses the pre-obtained SRB configuration information of the second access network device to establish the RRC connection to the second access network device. This can speed up RRC connection restoration, and shorten a latency of restoring a dual-connectivity working mode. In addition, transmission is not interrupted in a dual-connection restoration process. Therefore, a low-latency requirement is met.

In a possible design, the terminal device receives RRC connection reconfiguration information sent by the first access network device, where the RRC connection reconfiguration information includes the first configuration information.

In a possible design, before the using, by the terminal device, the SRB configuration information of the second access network device to establish an RRC connection to the second access network device, the method further includes: receiving, by the terminal device, first instruction information sent by the first access network device, where the first instruction information instructs the terminal device to use the SRB configuration information of the second access network device to establish the RRC connection to the second access network device. In this way, without being limited by the trigger condition, the first access network device can instruct, based on information such as a load status of the first access network device, the terminal device to establish the RRC connection to the second access network device.

In a possible design, the method further includes: receiving, by the terminal device, second configuration information sent by the second access network device, where the second configuration information includes configuration information of a third access network device; and using, by the terminal device, the configuration information of the third access network device to establish a communication connection to the third access network device.

In a possible design, the method further includes: receiving, by the terminal device, a first message sent by the second access network device, where the first message includes identification information of a fourth access network device; establishing, by the terminal device, an RRC connection to the fourth access network device based on the identification information of the fourth access network device; and receiving, by the terminal device, an RRC connection release message sent by the second access network device or the fourth access network device.

In a possible design, the method further includes: determining, by the terminal device, a fifth access network device; establishing, by the terminal device, an RRC connection to the fifth access network device; and receiving, by the terminal device, an RRC connection release message sent by the second access network device or the fifth access network device.

In a possible design, the method further includes: when the first configuration information of the second access network device meets a first condition, discarding, by the terminal device, the first configuration information.

In a possible design, the first condition includes at least one of the following conditions:

the terminal device does not use the first configuration information within a predetermined time;

the terminal device receives second instruction information sent by the first access network device, where the second instruction information instructs the terminal device to discard the first configuration information; and the terminal device receives a second message sent by the first access network device, where the second message includes updated first configuration information.

According to another aspect, an embodiment of the present invention provides a communication method in a wireless network. The method includes: establishing, by a first access network device, a radio resource control RRC connection to a terminal device, where the RRC connection is one of dual connections, and the dual connections further include a communication connection between the terminal device and a second access network device; and sending, by the first access network device, first configuration information to the terminal device, where the first configuration information includes signaling radio bearer SRB configuration information of the second access network device and a trigger condition for using the SRB configuration information, and the SRB configuration information of the second access network device is used by the terminal device to establish an RRC connection to the second access network device when the trigger condition is met. According to the method provided in this embodiment, the first access network device can send the SRB configuration information of the second access network device and the trigger condition to the terminal device in advance. In this way, when the trigger condition is met, the terminal device can use the SRB configuration information of the second access network device to quickly restore the RRC connection, thereby shortening a latency of restoring a dual-connectivity working mode. In addition, transmission is not interrupted in a dual-connection restoration process. Therefore, a low-latency requirement is met.

In a possible design, the method further includes: sending, by the first access network device, first instruction information to the terminal device, where the first instruction information instructs the terminal device to use the SRB configuration information of the second access network device to establish the RRC connection to the second access network device.

In a possible design, the method further includes: setting, by the first access network device, a predetermined time for the first configuration information, where the predetermined time is used by the terminal device to discard the first configuration information when the first configuration information is not used within the predetermined time; or sending, by the first access network device, second instruction information to the terminal device, where the second instruction information instructs the terminal device to discard the first configuration information; or sending, by the first access network device, a second message to the terminal device, where the second message includes updated first configuration information.

According to still another aspect, an embodiment of the present invention provides a communication method in a wireless network. The method includes: establishing, by a second access network device, a communication connection to a terminal device, where the communication connection is one of dual connections, and the dual connections further include a radio resource control RRC connection between the terminal device and a first access network device; and establishing, by the second access network device, an RRC connection to the terminal device when a trigger condition is met, where the RRC connection is established by using SRB configuration information of the second access network device, and the SRB configuration information of the second access network device and the trigger condition are sent by the first access network device to the terminal device by using first configuration information. According to the method provided in this embodiment, when the trigger condition is met, the terminal device can use the SRB configuration information of the second access network device to quickly restore the RRC connection, and the second access network device changes to a master access network device and temporarily or permanently serves as the master access network device. This avoids transmission interruption in a dual-connection restoration process, and shortens a latency of restoring a dual-connectivity working mode, thereby meeting a low-latency requirement.

In a possible design, the method further includes: sending, by the second access network device, an addition request to a third access network device; receiving, by the second access network device, an addition request acknowledgement sent by the third access network device; configuring, by the second access network device, the third access network device, and sending a configuration complete message to the third access network device; and sending, by the second access network device, second configuration information to the terminal device, where the second configuration information includes configuration information of the third access network device, and the second configuration information is used by the terminal device to establish a communication connection to the third access network device.

In a possible design, the method further includes: determining, by the second access network device, a fourth access network device; and sending, by the second access network device, a first message to the terminal device, where the first message includes identification information of the fourth access network device, and the identification information of the fourth access network device is used by the terminal device to establish an RRC connection to the fourth access network device.

In a possible design, the method further includes: sending, by the second access network device, an RRC connection release message to the terminal device.

According to yet another aspect, an embodiment of the present invention provides a terminal device, including a processing unit and a transceiver unit. The processing unit is configured to control the terminal device to establish dual connections to a first access network device and a second access network device, where a connection, between the terminal device and the first access network device, included in the dual connections is a radio resource control RRC connection. The transceiver unit is configured to receive first configuration information sent by the first access network device, where the first configuration information includes signaling radio bearer SRB configuration information of the second access network device and a trigger condition for using the SRB configuration information. When the trigger condition is met, the processing unit is further configured to control the terminal device to use the SRB configuration information of the second access network device to establish an RRC connection to the second access network device.

In a possible design, the transceiver unit is further configured to receive first instruction information sent by the first access network device, where the first instruction information instructs the terminal device to use the SRB configuration information of the second access network device to establish the RRC connection to the second access network device.

In a possible design, the transceiver unit is further configured to receive second configuration information sent by the second access network device, where the second configuration information includes configuration information of a third access network device; and the processing unit is further configured to control the terminal device to use the configuration information of the third access network device to establish a communication connection to the third access network device.

In a possible design, the transceiver unit is further configured to receive a first message sent by the second access network device, where the first message includes identification information of a fourth access network device; the processing unit is further configured to control, based on the identification information of the fourth access network device, the terminal device to establish an RRC connection to the fourth access network device; and the transceiver unit is further configured to receive an RRC connection release message sent by the second access network device or the fourth access network device.

In a possible design, the processing unit is further configured to determine a fifth access network device; the processing unit is further configured to control the terminal device to establish an RRC connection to the fifth access network device; and the transceiver unit is further configured to receive an RRC connection release message sent by the second access network device or the fifth access network device.

In a possible design, when the first configuration information meets a first condition, the processing unit is further configured to discard the first configuration information.

In a possible design, the terminal device may implement, by using hardware, functions performed by the terminal device in the foregoing method. A structure of the terminal device may include a transceiver and a processor. The transceiver can implement functions of the transceiver unit, and the processor can implement functions of the processing unit.

In a possible design, the terminal device may implement, alternatively by using hardware executing corresponding software, functions performed by the terminal device in the foregoing method. The hardware or software includes one or more modules corresponding to the foregoing functions. The modules may be software and/or hardware.

According to still yet another aspect, an embodiment of the present invention provides an access network device, including a processing unit and a transceiver unit. The processing unit is configured to control the access network device to establish a radio resource control RRC connection to a terminal device by using the transceiver unit, where the RRC connection is one of dual connections, and the dual connections further include a communication connection between the terminal device and a second access network device. The transceiver unit is configured to send first configuration information to the terminal device, where the first configuration information includes signaling radio bearer SRB configuration information of the second access network device and a trigger condition for using the SRB configuration information, and the SRB configuration information of the second access network device is used by the terminal device to establish an RRC connection to the second access network device when the trigger condition is met.

In a possible design, the access network device may implement, by using hardware, functions performed by the access network device in the foregoing method. A structure of the access network device may include a processor and a transceiver. The processor can implement functions of the processing unit. The transceiver can implement functions of the transceiver unit.

In a possible design, the access network device may implement, alternatively by using hardware executing corresponding software, functions performed by the access network device in the foregoing method. The hardware or software includes one or more modules corresponding to the foregoing functions. The modules may be software and/or hardware.

According to a further aspect, an embodiment of the present invention provides an access network device, including a processing unit and a transceiver unit. The processing unit is configured to control the access network device to establish a communication connection to a terminal device by using the transceiver unit, where the communication connection is one of dual connections, and the dual connections further include a radio resource control RRC connection between the terminal device and a first access network device, when a trigger condition is met, the processing unit is further configured to control the second access network device to establish an RRC connection to the terminal device, where the RRC connection is established by using SRB configuration information of the second access network device, and the SRB configuration information of the second access network device and the trigger condition are sent by the first access network device to the terminal device by using first configuration information.

In a possible design, the access network device may implement, by using hardware, functions performed by the access network device in the foregoing method. A structure of the access network device may include a processor and a transceiver. The processor can implement functions of the processing unit. The transceiver can implement functions of the transceiver unit.

In a possible design, the access network device may implement, alternatively by using hardware executing corresponding software, functions performed by the access network device in the foregoing method. The hardware or software includes one or more modules corresponding to the foregoing functions. The modules may be software and/or hardware.

For the foregoing aspects, in a possible design, the trigger condition includes at least one of the following conditions:

a radio link failure RLF occurs between the terminal device and the first access network device;

quality of a radio link between the terminal device and the first access network device is lower than a first threshold;

quality of a radio link between the terminal device and the second access network device is higher than a second threshold;

the quality of the radio link between the terminal device and the second access network device is higher than a third threshold, and a value by which the quality of the radio link between the terminal device and the second access network device is higher than the quality of the radio link between the terminal device and the first access network device is greater than a fourth threshold;

the quality of the radio link between the terminal device and the first access network device is lower than a fifth threshold, and the quality of the radio link between the terminal device and the second access network device is higher than a sixth threshold; and the quality of the radio link between the terminal device and the first access network device is lower than a seventh threshold, and the value by which the quality of the radio link between the terminal device and the second access network device is higher than the quality of the radio link between the terminal device and the first access network device is greater than an eighth threshold.

For the foregoing aspects, in a possible design, the SRB configuration information includes SRB0 configuration information, or SRB0 configuration information and SRB1 configuration information, and an SRB type is a secondary cell group SCG bearer or a split bearer.

For the foregoing aspects, in a possible design, the first configuration information further includes random access configuration information, and the random access configuration information is used by the terminal device to initiate, to the second access network device, a random access process for RRC connection establishment.

For the foregoing aspects, in a possible design, the first configuration information further includes measurement configuration information, and the measurement configuration information is used by the terminal device to determine, based on a result obtained by performing measurement by using the measurement configuration information, whether the trigger condition is met.

According to a still further aspect, an embodiment of the present invention provides a computer readable storage medium, where a computer program is stored in the computer readable storage medium, and when the program is executed by a processor, steps of the method in the foregoing aspects are implemented.

According to a yet further aspect, an embodiment of the present invention provides a communications system, where the system includes the terminal device and the access network device in the foregoing aspects.

According to a still yet further aspect, an embodiment of the present invention provides a computer storage medium, configured to store a computer software instruction used by the foregoing terminal device. The computer software instruction includes a program designed for controlling the terminal device to implement the foregoing aspect.

According to even yet another aspect, an embodiment of the present invention provides a computer storage medium, configured to store a computer software instruction used by the foregoing access network device. The computer software instruction includes a program designed for controlling the access network device to implement the foregoing aspect.

According to the technical solutions provided in the embodiments of the present invention, the first access network device sends the SRB configuration information of the second access network device and the trigger condition to the terminal device in advance. When the trigger condition is met, the terminal device uses the SRB configuration information of the second access network device to establish the RRC connection to the second access network device. This can speed up RRC connection restoration, and shorten a latency of restoring a dual-connectivity working mode. In addition, transmission is not interrupted in a dual-connection restoration process. Therefore, a low-latency requirement is met.

DESCRIPTION OF EMBODIMENTS

The following describes technical solutions in embodiments of the present invention with reference to accompanying drawings.

Figure 1:
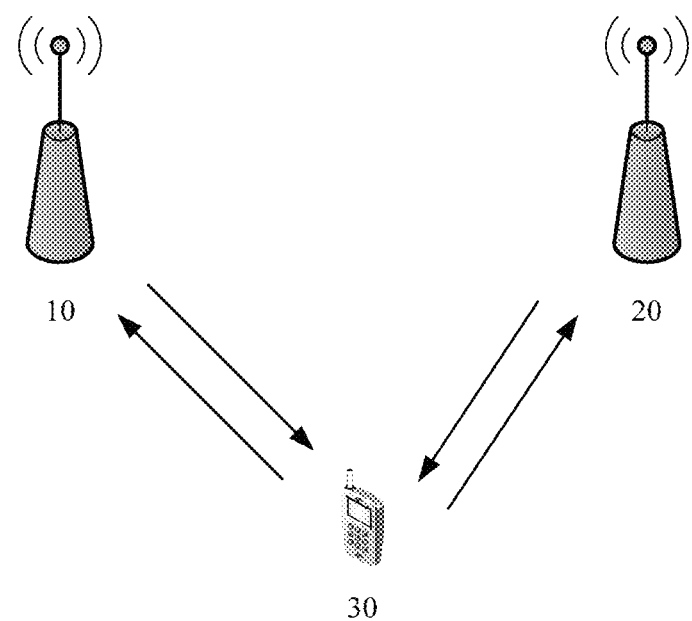
FIG. 1 is a schematic diagram of a communications system according to an embodiment of the present invention.

The technical solutions proposed in the embodiments of the present invention are based on a communications system 100 shown in FIG. 1. The communications system 100 can support a service having a low-latency requirement, for example, a URLLC service. It can be understood that the communications system 100 also supports a data service having a conventional latency requirement. The communications system 100 includes at least two access network devices and at least one terminal device. As shown in FIG. 1, the communications system 100 includes, for example, access network devices 10 and 20 and a terminal device 30. The access network devices 10 and 20 and the terminal device 30 establish a DC architecture. The access network device 10 is a master access network device, and the access network device 20 is a secondary access network device. The access network device 10 establishes an RRC connection to the terminal device 30, to transmit control information and data. The access network device 10 establishes a communication connection to the terminal device 30, to assist the access network device 10 in data transmission. The access network device 10 communicates with the access network device 20 by using an X2 interface.

It should be understood that, in this embodiment of the present invention, the communications system 100 may be a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), another wireless communications system applying an orthogonal frequency division multiplexing (OFDM) technology, or the like. In addition, the communications system 100 may also be applicable to 5G mobile communications. A system architecture and a service scenario that are described in the embodiments of the present invention are intended to describe the technical solutions in the embodiments of the present invention more clearly, and constitute no limitation on the technical solutions provided in the embodiments of the present invention. A person of ordinary skill in the art may be aware that, as network architectures evolve and new service scenarios emerge, the technical solutions provided in the embodiments of the present invention are also applicable to similar technical problems.

In this embodiment of the present invention, the terminal device may also be referred to as user equipment (UE), a mobile station (MS), a mobile terminal or the like. The terminal device may communicate with one or more core networks by using a radio access network (RAN). For example, the terminal device may be a mobile phone (also referred to as a "cellular" phone), or a computer having a mobile terminal. For example, the terminal device may be alternatively a portable mobile apparatus, a pocket-sized mobile apparatus, a handheld mobile apparatus, a computer built-in mobile apparatus, or an in-vehicle mobile apparatus, which exchanges voice and/or data with the radio access network.

In this embodiment of the present invention, the access network device may be a base transceiver station (BTS) in GSM or CDMA, may be a NodeB (NB) in WCDMA, may be an evolved NodeB (eNB or e-NodeB) in LTE, or may even be a new-generation access network device in a 5G system. In this embodiment of the present invention, the access network device and the terminal device are not specifically limited.

It should be noted that a quantity of terminal devices included in the communications system 100 shown in FIG. 1 is merely an example, and this embodiment of the present invention is not limited thereto. For example, more terminal devices communicating with the access network device may be further included, and for brevity, are not depicted one by one in the accompanying drawings. In addition, although the access network device 10, the access network device 20, and the terminal device 30 are shown in the communications system 100 shown in FIG. 1, the communications system 100 may not only include the access network devices and the terminal device, but also include, for example, a core network device or a device configured to carry a virtualized network function. This is obvious to a person of ordinary skill in the art and is not described herein in detail.

As described above, in a dual connectivity architecture, a terminal device may maintain communication connections to two access network devices simultaneously, and the two access network devices are a master access network device and a secondary access network device. The master access network device and the secondary access network device each may have an RRC entity. However, the terminal device can support only one RRC state. Therefore, the terminal device establishes an RRC connection only to the master access network device. The terminal device establishes a communication connection to the secondary access network device. The communication connection is a non-RRC connection. The communication connection as the non-RRC connection may include a carrier aggregation (CA) connection, a multi-beam (beam) or transmission reception point (TRP) connection, a multi-panel connection, and the like. It can be understood that the communication connection as the non-RRC connection may further include other connection manners that can be supported by a current mobile communications system and a 5G mobile communications system. This is not specifically limited herein. Then, the master access network device establishes the DC architecture with the terminal device by adding the secondary access network device.

Figure 2:
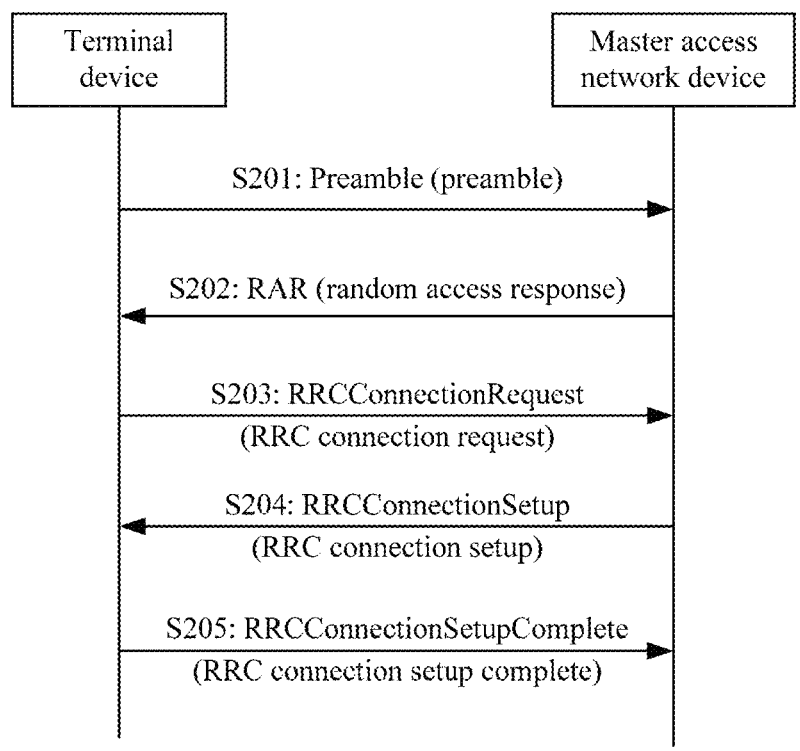
FIG. 2 is a schematic diagram of RRC connection establishment according to an embodiment of the present invention.

A process of establishing the RRC connection to the master access network device by the terminal device may be implemented through random access. Signaling in the RRC connection establishment process is sent on signaling radio bearers (SRB). The SRBs used in the RRC connection establishment process mainly include an SRB0 and an SRB1. FIG. 2 shows a simple process of establishing the RRC connection to the master access network device by the terminal device. The process mainly includes the following steps.

S201: The terminal device sends a preamble to the master access network device.

The master access network device may allocate the preamble to the terminal device based on contention-based random access or non-contention based random access. The master access network device further allocates, to the terminal device, an uplink resource used for random access.

S202: The master access network device returns a random access response (RAR) to the terminal device after receiving the preamble.

S203: After receiving the RAR, the terminal device sends an RRC connection request message RRCConnectionRequest to the master access network device by using the SRB0.

S204: The master access network device sends an RRC connection setup message RRCConnectionSetup to the terminal device by using the SRB0, where the RRC connection setup message includes SRB1 configuration information.

S205: The terminal device sends an RRC connection setup complete message RRCConnectionSetupComplete to the master access network device by using the SRB1, and the master access network device establishes an S1 interface based on the RRC connection setup complete message.

The terminal device establishes the RRC connection to the master access network device by performing the foregoing process. The master access network device may exchange control information and data with the terminal device through the RRC connection.

Figure 3:
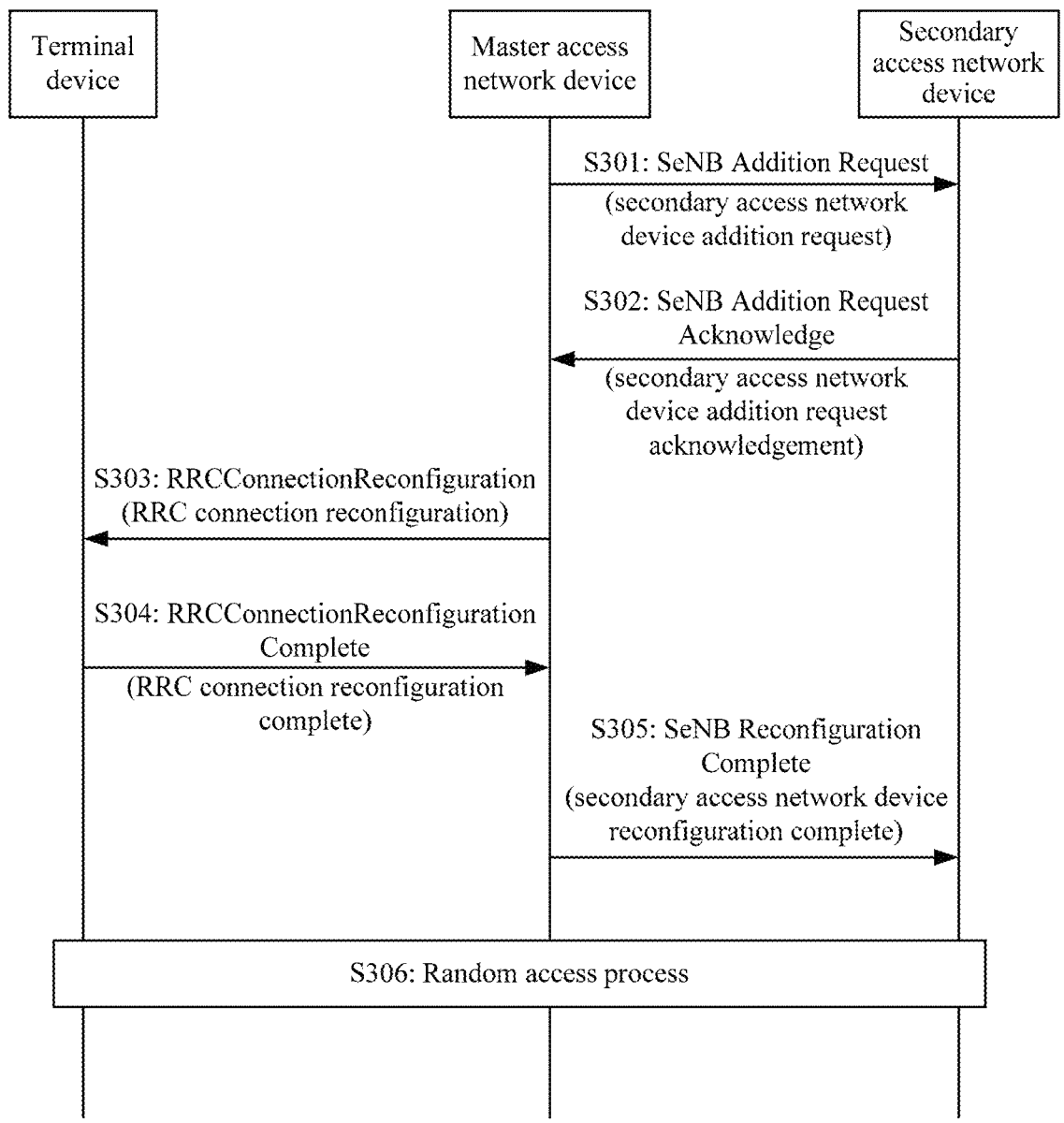
FIG. 3 is a schematic diagram of addition of a secondary access network device according to an embodiment of the present invention.

Then, the master access network device needs to add the secondary access network device for data offloading. FIG. 3 shows a simple process of adding the secondary access network device by the master access network device. The process mainly includes the following steps.

S301: The master access network device (for example, MeNB) sends a secondary access network device addition request SeNB Addition Request to the secondary access network device (for example, SeNB).

The secondary access network device addition request includes configuration information of the secondary access network device.

S302: After receiving the configuration information, the secondary access network device replies with acknowledgement (ACK) information if accepting the configuration.

S303: After receiving the ACK, the master access network device adds information about the secondary access network device to an RRC connection reconfiguration message RRCConnectionReconfiguration, and sends the RRC connection reconfiguration message to the terminal device.

The information about the secondary access network device includes the configuration information of the secondary access network device and configuration information that is used by the terminal device to initiate random access to the secondary access network device.

S304: The terminal device performs reconfiguration after receiving the RRC connection reconfiguration message, and sends an RRC connection reconfiguration complete message RRCConnectionReconfigurationComplete to the master access network device.

S305: The master access network device sends a secondary access network device reconfiguration complete message SeNB Reconfiguration Complete to the secondary access network device.

S306: The terminal device uses the configuration information of the secondary access network device in the RRC connection reconfiguration message to initiate random access to the secondary access network device, so as to establish a communication connection.

The terminal device completes establishment of the dual connectivity architecture with the master access network device and the secondary access network device through the foregoing process.

In the existing dual connectivity architecture, an RLF may occur between the master access network device and the terminal device. The terminal device establishes the RRC connection only to the master access network device, and maintains only the communication connection but no RRC connection to the secondary access network device. Therefore, when an RLF occurs between the terminal device and the master access network device, it is deemed that an RLF occurs on both links of the dual connectivity architecture. In this case, the terminal device needs to search for a new master access network device to re-establish an RRC connection. Then, the new master access network device adds the original secondary access network device or a new secondary access network device to restore the dual connectivity architecture.

However, during RRC connection re-establishment, data is transmitted neither between the terminal device and the master access network device nor between the terminal device and the secondary access network device, that is, data transmission is interrupted. During RRC connection re-establishment, a large quantity of signaling is exchanged, and a large latency is caused. Consequently, a relatively large interruption latency is caused. To restore the dual connectivity architecture, an RRC connection reconfiguration process further needs to be performed to re-add the secondary access network device or change the secondary access network device, and this causes a relatively large restoration latency. Therefore, it is quite difficult for a working mode of the existing dual connectivity architecture to satisfy a 5G mobile communications service, and in particular, a URLLC service having a strict low-latency requirement.

Based on the foregoing problem, in a communication method in a wireless network provided in the embodiments of the present invention, a master access network device sends signaling radio bearer (SRB) configuration information of a secondary access network device and a trigger condition to a terminal device in advance, and when the trigger condition is met, the terminal device uses the SRB configuration information of the secondary access network device to establish an RRC connection to the secondary access network device. This can speed up RRC connection restoration and restoration of a dual-connectivity working mode, and reduce a data transmission interruption latency, thereby meeting a low-latency requirement.

Figure 4:
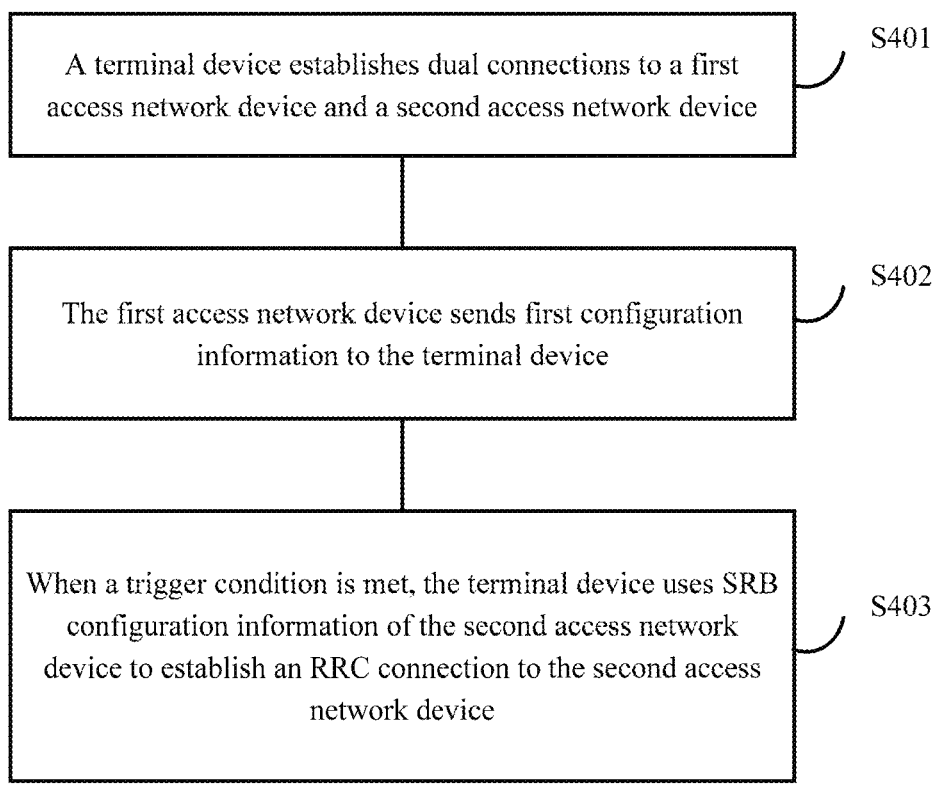
FIG. 4 is a schematic diagram of a communication method in a wireless network according to an embodiment of the present invention.

FIG. 4 is a schematic diagram illustrating, in an interaction manner, a communication method in a wireless network according to an embodiment of the present invention. The following describes, in detail with reference to FIG. 4, the method provided in this embodiment.

S401: A terminal device establishes dual connections to a first access network device and a second access network device.

A connection, between the terminal device and the first access network device, included in the dual connections is a radio resource control RRC connection.

It can be understood that, in the dual connections, the first access network device is a master access network device, and the second access network device is a secondary access network device. The terminal device establishes an RRC connection to the first access network device, and establishes a communication connection to the second access network device. The terminal device may establish a dual connectivity architecture with the first access network device and the second access network device through the processes shown in FIG. 2 and FIG. 3. Details are not described herein again.

As described above, the communication connection is a non-RRC connection. The communication connection as the non-RRC connection may include a CA connection, a multi-beam or TRP connection, a multi-panel connection, and other non-RRC connection manners that can be supported by a current mobile communications system and a 5G mobile communications system.

S402: The first access network device sends first configuration information to the terminal device.

Correspondingly, the terminal device receives the first configuration information sent by the first access network device.

The first configuration information includes SRB configuration information of the second access network device and a trigger condition for using the SRB configuration information by the terminal device.

Optionally, the SRB configuration information includes SRB0 configuration information of the second access network device. The SRB0 configuration information includes parameter information used by the second access network device to transmit an RRC message on a common control channel (CCCH).

The SRB configuration information may alternatively include SRB0 configuration information and SRB1 configuration information of the second access network device. The SRB1 configuration information includes parameter information used by the second access network device to transmit an RRC message on a dedicated control channel (DCCH).

Optionally, the SRB configuration information is secondary cell group (SCG) bearer configuration information. For SCG bearer configuration, downlink data may be directly sent by the secondary access network device to the terminal device, and uplink data may be sent by the terminal device to the secondary access network device and then sent by the secondary access network device directly to an upper-level device.

The SRB configuration information may be alternatively a split bearer. For split bearer configuration, downlink data may be sent by the master access network device to the secondary access network device, and then sent by the secondary access network device to the terminal device; and uplink data is sent by the terminal to the secondary access network device, the secondary access network device sends the data to the master access network device, and the master access network device sends the data to an upper-level device.

Optionally, the first configuration information further includes random access configuration information. The random access configuration information may include a random access preamble allocated by the first access network device to the terminal device and an uplink resource required for random access. The first access network device may allocate the random access preamble to the terminal device based on a contention-based random access manner or a non-contention based random access manner. The random access preamble and the random access resource may be dedicated for the terminal device, or may be shared by a plurality of terminal devices.

The first access network device may set a first timer for the random access resource. If the terminal device does not use the random access resource before the first timer expires, the first access network device releases the random access resource. The first access network device may allocate the random access resource to another terminal device for use. This can improve resource utilization and avoid a waste caused by idle resources.

Optionally, the first configuration information further includes measurement configuration information. The measurement configuration information includes at least one of a measurement object, a measurement time (measurement duration), a measurement threshold, and measurement result reporting.

Optionally, the measurement configuration information may be configuration information used by the terminal device to perform cell measurement. The measurement object may include, for example, a cell-specific reference signal (CRS).

The measurement configuration information may be alternatively configuration information required by the terminal device to measure a radio link with the first access network device and/or a radio link with the second access network device. The measurement object may include, for example, a reference signal received power (RSRP), reference signal received quality (RSRQ), or a received signal strength indicator (RSSI).

The measurement configuration information may be alternatively configuration information required by the terminal device to perform beam measurement. In 5G mobile communications, each radio link may include a plurality of beams, and correspondingly, quality of the radio link may be measured by using the beams. Therefore, a measurement granularity of the beam measurement is finer than that of radio link measurement. For beam measurement, the measurement object may include a quantity of measured beams and a type of a measured beam (a beam type of a data channel or a control channel).

It can be understood that the terminal device may alternatively determine radio link quality or cell quality in a predetermined manner instead of by using the measurement configuration information.

The terminal device may use the SRB configuration information of the second access network device when quality of the radio link with the first access network device is relatively poor. The trigger condition may include at least one of the following conditions:

(a) an RLF occurs between the terminal device and the first access network device;

(b) the quality of the radio link between the terminal device and the first access network device is lower than a first threshold;

(c) quality of the radio link between the terminal device and the second access network device is higher than a second threshold;

(d) the quality of the radio link between the terminal device and the second access network device is higher than a third threshold, and a value by which the quality of the radio link between the terminal device and the second access network device is higher than the quality of the radio link between the terminal device and the first access network device is greater than a fourth threshold;

(e) the quality of the radio link between the terminal device and the first access network device is lower than a fifth threshold, and the quality of the radio link between the terminal device and the second access network device is higher than a sixth threshold; and (f) the quality of the radio link between the terminal device and the first access network device is lower than a seventh threshold, and the value by which the quality of the radio link between the terminal device and the second access network device is higher than the quality of the radio link between the terminal device and the first access network device is greater than an eighth threshold.

It should be noted that the "first threshold", the "second threshold", . . . , and the "eighth threshold" are only intended to distinguish between thresholds in different conditions. In an actual trigger condition, it is not limited that there need to be a same quantity of thresholds as that in the foregoing descriptions. The first access network device may set or change the foregoing thresholds depending on a requirement. This is not specifically limited herein.

Optionally, the first configuration information further includes packet data convergence protocol (PDCP) configuration information (for example, a security key or a security algorithm), radio link control (RLC) mode information (for example, one of a transparent mode (TM), an acknowledged mode (AM), and an unacknowledged mode (UM)), and media access control (MAC) layer logical channel configuration information of the second access network device. The foregoing information is configuration information required for a communication pipe between the terminal device and the second access network device.

Optionally, the first access network device adds the first configuration information to RRC connection reconfiguration information RRCConnectionReconfiguration, and sends the RRC connection reconfiguration information to the terminal device. For example, the first access network device may add the SRB configuration information of the second access network device to a RadioResourceConfigDedicated information element in the RRC connection reconfiguration message.

S403: When the trigger condition is met, the terminal device uses the SRB configuration information of the second access network device to establish an RRC connection to the second access network device.

Optionally, the terminal device determines the radio link quality in the predetermined manner. For example, for the trigger condition (a) in step S402, the terminal device determines, in the predetermined manner, whether an RLF occurs on the radio link between the terminal device and the first access network device.

The terminal device may keep listening on a physical downlink control channel (PDCCH) after establishing the RRC connection to the first access network device. After a quantity of out-of-synchronization indicators out-of-sync received by the terminal device reaches a predetermined quantity, the terminal device starts a timer T310. If a quantity of in-synchronization indicators in-sync received by the terminal device reaches a predetermined quantity before the timer T310 expires, it is deemed that the quality of the radio link between the terminal device and the first access network device is restored. Otherwise, if a quantity of in-synchronization indicators in-sync received by the terminal device does not reach a predetermined quantity before the timer T310 expires, it is deemed that an RLF occurs between the terminal device and the first access network device.

The terminal device may further determine the radio link quality by using a quantity of retransmission times at an RLC layer or a MAC layer. For example, when a maximum quantity of retransmissions is reached at the RLC layer or the MAC layer, an RLF occurs between the terminal device and the first access network device.

Optionally, the terminal device performs measurement and determines the radio link quality based on a measurement result. For example, for the trigger conditions (b) to (f) in step S402, the terminal device may measure the radio link with the first access network device and/or the radio link with the second access network device based on the measurement configuration information.

If the terminal device supports beam measurement, the terminal device performs beam measurement based on configuration information of the beam measurement. The radio link quality may be represented by quality of a predetermined quantity of best beams. The predetermined quantity may be one or more. If the terminal device does not support beam measurement, the terminal device performs radio link measurement or cell measurement based on the measurement configuration information. For example, the terminal device measures an RSRP or RSRQ of the radio link. For another example, the terminal device measures a cell-specific reference signal of a cell.

It can be understood that, the terminal device may alternatively determine the radio link quality in another possible manner, provided that whether the trigger condition is met can be determined. When the trigger condition is met, the terminal device uses the SRB configuration information of the second access network device to establish the RRC connection to the second access network device.

Besides the foregoing manner, the terminal device may alternatively use the SRB configuration information of the second access network device as instructed by the first access network device. For example, because of overload or the like, the first access network device may be unable to continue serving as a master base station to provide a service for the terminal device. In this case, the first access network device sends first instruction information to the terminal device. After receiving the first instruction information, the terminal device uses the SRB configuration information of the second access network device.

It can be understood that the terminal device may establish the RRC connection to the second access network device through the procedure shown in FIG. 2. Directly using the SRB configuration information, preconfigured by the first access network device, of the second access network device reduces signaling consumption during RRC connection and a consequent latency. This can speed up RRC connection re-establishment compared with the prior art.

Optionally, the terminal device uses the random access configuration information included in the first configuration information to initiate a random access process to the second access network device. This simplifies setting, omits a configuration process performed before random access, and effectively reduces an RRC connection establishment latency.

It can be understood that the first access network device sends an RRC connection release message to the terminal device after the terminal device establishes the RRC connection to the second access network device, so that the terminal device maintains the RRC connection only to the second access network device. In this case, the second access network device temporarily serves as the master access network device in place of the first access network device, and performs a function that is previously performed by the first access network device.

Optionally, the second access network device determines whether to change a role. To be specific, after the RRC connection is established between the second access network device and the terminal device, the second access network device only temporarily serves as the master access network device in place of the first access network device. The second access network device needs to determine whether to formally change to the master access network device. The second access network device may determine, based on a load status of the second access network device, whether to change the role, or may determine, by measuring signal quality of another nearby access network device, whether to change the role.

In a possible implementation, the second access network device determines to change the role. To be specific, the second access network device formally changes to the master access network device. To restore a dual connectivity architecture, the second access network device needs to add a new secondary access network device for data service offloading.

Optionally, the second access network device exchanges information by using an X2 interface between access network devices, to obtain information about a third access network device. The information includes, for example, measurement configuration information of the third access network device and data radio bearer (DRB) information. Then, the second access network device adds the third access network as the new secondary access network device, and sends configuration information of the third access network device to the terminal device. The second access network device, the third access network device, and the terminal device may establish a new dual connectivity architecture through the procedure shown in FIG. 3. The process mainly includes:

sending, by the second access network device, an addition request to the third access network device;

receiving, by the second access network device, an addition request acknowledgement sent by the third access network device; and configuring, by the second access network device, the third access network device, and sending a configuration complete message to the third access network device.

Then, the second access network device sends second configuration information to the terminal device, where the second configuration information includes the configuration information of the third access network device. The second configuration information may be carried in the RRC connection reconfiguration information, to be sent to the terminal device. The terminal device uses the configuration information of the third access network device to establish a communication connection to the third access network device, so as to restore a normal dual-connectivity working mode.

In the foregoing process, the second access network device directly changes to the master access network device and adds the new secondary access network device (the third access network device), thereby speeding up dual connectivity architecture restoration. During dual-connection restoration, the second access network device and the terminal device maintain the RRC connection. Therefore, neither control signaling transmission nor data transmission is interrupted, so that a low-latency requirement is effectively met.

In another possible implementation, instead of changing the role, the second access network device determines to temporarily serve as the master access network device in place of the first access network device, until a new master access network device is determined.

Optionally, the second access network device adds a new access network device, for example, a fourth access network device. The second access network device may determine the fourth access network device based on any one or a combination of camping history information of the terminal device, serving history information of another access network device, and signal quality of a surrounding access network device. For example, the fourth access network device may be an access network device with best signal quality measured by the second access network device. The foregoing information may be reported by the terminal device to the second access network device, or may be obtained by the second access network device by interacting with the first access network device through an X2 interface. Then, the second access network device exchanges information with the fourth access network device through an X2 interface. The exchanged information includes context information, configuration information, measurement information, and the like of the terminal device. The exchanged information may be measured by the second access network device, or may be reported by the terminal device to the second access network device.

The second access network device sends a first message to the terminal device after determining the fourth access network device. The first message includes identification information of the fourth access network device. Then, the terminal device establishes an RRC connection to the fourth access network device through the procedure shown in FIG. 2.

Optionally, the terminal device adds a new access network device, for example, a fifth access network device. The terminal device may determine the fifth access network device based on any one or a combination of camping history information of the terminal device, serving history information of another access network device, and signal quality of a surrounding access network device. The fifth access network device may be a surrounding access network device with best signal quality measured by the terminal device. After determining the fifth access network device, the terminal device establishes an RRC connection to the fifth access network device through the procedure shown in FIG. 2.

It should be noted that both the fourth access network device and the fifth access network device are new access network devices used for dual connectivity architecture restoration, rather than particular access network devices. Therefore, the "fourth" and "fifth" are only intended to distinguish between determining manners (determining by the second access network device and determining by the terminal device).

In the foregoing process, the second access network device and the terminal device maintain the RRC connection. Therefore, neither control signaling transmission nor data transmission is interrupted, so that a low-latency requirement is effectively met.

It can be understood that after the terminal device establishes the RRC connection to the fourth access network device or the fifth access network device, because the terminal device has established the RRC connection to the second access network device, the two RRC connections exist simultaneously. In the dual connectivity architecture, the terminal device maintains an RRC connection to only one access network device, and therefore one of the two RRC connections needs to be released.

Optionally, the second access network device sends an RRC connection release message to the terminal device, so that the terminal device maintains an RRC connection only to the fourth access network device or the fifth access network device.

Alternatively, the second access network device may be compared with the fourth access network device or the fifth access network device, so as to determine which access network device has better radio link quality. The access network device with poorer radio link quality sends an RRC connection release message to the terminal device, and the access network device with better radio link quality is kept as a new master access network device and maintains the RRC connection to the terminal device. This manner can ensure RRC connection quality, thereby ensuring dual-connection reliability.

It can be understood that, the access network device that sends the RRC connection release message no longer maintains the RRC connection to the terminal device, and therefore can directly switch to act as a secondary access network device in the dual connections. This simplifies a process of adding a secondary access network device, and speeds up restoration of a dual-connectivity working mode.

Certainly, the access network device that sends the RRC connection release message may alternatively break down a communication connection to the terminal device. In this case, the terminal device may establish a communication connection to a new access network device, to restore a dual-connectivity working mode.

It should be noted that the third access network device, the fourth access network, and the fifth access network device in the foregoing descriptions are only intended to distinguish between access network devices in different implementations. In an actual communications system, it is not limited that there need to be a same quantity of access network devices as that in the foregoing descriptions.

The foregoing describes a possible process in which the terminal device uses, when the trigger condition is met, the first configuration information of the second access network device to establish the RRC connection to the second access network device, to reconstruct dual connections. In a possible case, the RRC connection between the terminal device and the first access network device is well maintained, so that the first configuration information does not need to be used in a long time. This means that the terminal device may need to keep storing the first configuration information, to use the first configuration information when needed. In other words, the first configuration information needs to occupy a part of storage space of the terminal device for a long time without being used. When the storage space of the terminal device is insufficient, this case may cause a decrease in working efficiency of the terminal device.

Optionally, for the foregoing case, the first configuration information has a specific validity period. When the first configuration information meets a first condition, the terminal device discards the first configuration information. The first condition may include at least one of the following conditions.

(a) The terminal device does not use the first configuration information within a predetermined time.

For example, in step S402, the first access network device may set the first timer for the random access resource, and the timer may also act on the first configuration information. If the terminal device does not use the random access resource before the first timer expires, it is deemed that the terminal device does not use the first configuration information, either. In this case, the terminal device discards the first configuration information.

(b) The first access network device sends second instruction information to the terminal device. The second instruction information instructs the terminal device to discard the first configuration information.

In the foregoing manner, the terminal device can discard the first configuration information when the first configuration information is not used in a long time, to release storage space, thereby improving working efficiency of the terminal device.

The terminal device receives a second message sent by the first access network device, where the second message includes updated first configuration information.

In addition, the terminal device may further update the first configuration information. For example, the terminal device receives the second message sent by the first access network device. The second message includes the updated first configuration information.

Optionally, the second message is an RRC connection reconfiguration message. The RRC connection reconfiguration message further includes updated configuration information of the first access network device. The terminal device decodes the RRC connection reconfiguration message after receiving the RRC connection reconfiguration message. If the RRC connection reconfiguration information includes only the updated configuration information of the first access network device, the original first configuration information is still valid. If the RRC connection reconfiguration information includes not only the configuration information of the first access network device but also the updated first configuration information, the terminal device discards the original first configuration information and stores the updated first configuration information.

The first configuration information is updated so that the first access network device can adjust configuration information of the second access network device in real time based on a network status, thereby implementing more flexible configuration.

According to the method provided in this embodiment of the present invention, the first access network device sends the SRB configuration information of the second access network device and the trigger condition to the terminal device in advance. When the trigger condition is met, the terminal device uses the SRB configuration information of the second access network device to establish the RRC connection to the second access network device. This can speed up RRC connection restoration and shorten a latency of restoring the dual-connectivity working mode, thereby meeting a low-latency requirement.

The foregoing mainly describes the data processing method provided in the embodiments of the present invention, from a perspective of interaction between network elements. It can be understood that, to implement the foregoing functions, the network elements, for example, the terminal device and the network devices, include corresponding hardware structures and/or software modules for performing the functions. A person of ordinary skill in the art should be easily aware that, in the embodiments of the present invention, units and algorithm steps in the examples described with reference to the embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
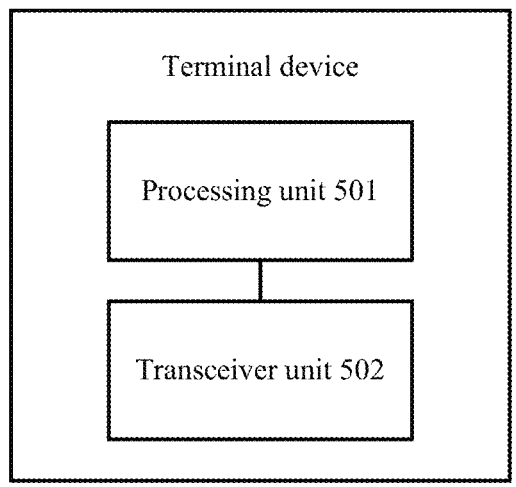
FIG. 5 is a possible schematic structural diagram of a terminal device according to an embodiment of the present invention.

FIG. 5 is a possible schematic structural diagram of the terminal device in the foregoing embodiments. It should be noted that the terminal device can implement the method in the foregoing embodiments. Therefore, for specific details of the terminal device, refer to the descriptions in the foregoing embodiments. For brevity, same content is not repeated in the following. The terminal device may be the terminal device 30 shown in FIG. 1. The terminal device includes a processing unit 501 and a transceiver unit 502.

The processing unit 501 is configured to control the terminal device to establish dual connections to a first access network device and a second access network device.

The dual connections include an RRC connection between the terminal device and the first access network device. Signaling for RRC connection establishment is exchanged by using the transceiver unit 502.

The transceiver unit 502 is configured to receive first configuration information sent by the first access network device.

The first configuration information includes signaling radio bearer SRB configuration information of the second access network device and a trigger condition for using the SRB configuration information.

The processing unit 501 is further configured to: when the trigger condition is met, control the terminal device to use the SRB configuration information of the second access network device to establish an RRC connection to the second access network device.

The trigger condition may include the conditions described in step S402 in FIG. 4, and details are not described herein again.

Optionally, the first configuration information includes the random access configuration information, the measurement configuration information, the PDCP configuration information, the RLC mode information, the MAC layer logical channel configuration information, and the like described in step S402 shown in FIG. 4.

Further, as described in step S402 in FIG. 4, the SRB configuration information may include SRB0 configuration information of the second access network device, or SRB0 configuration information and SRB1 configuration information of the second access network device. An SRB type may be an SCG bearer or a split bearer.

Optionally, the processing unit 501 is further configured to determine radio link quality in a predetermined manner. The processing unit 501 may further perform beam measurement, radio link measurement, or cell measurement based on the measurement configuration information, so that the processing unit 501 determines, based on a measurement result, whether the trigger condition is met.

Optionally, the transceiver unit 502 is further configured to receive first instruction information sent by the first access network device. The processing unit 501 controls, based on the first instruction information, the terminal device to use the SRB configuration information of the second access network device to establish the RRC connection to the second access network device.

The transceiver unit 502 may be further configured to receive second configuration information sent by the second access network device. The second configuration information includes configuration information of a third access network device. The processing unit 501 may be further configured to control the terminal device to use the configuration information of the third access network device to establish a communication connection, as a non-RRC connection, to the third access network device.

The transceiver unit 502 may be further configured to receive a first message sent by the second access network device. The first message includes identification information of a fourth access network device. The processing unit 501 may be further configured to control, based on the identification information of the fourth access network device, the terminal device to establish an RRC connection to the fourth access network device.

The transceiver unit 502 may be further configured to receive an RRC connection release message sent by the second access network device or the fourth access network device.

Optionally, the processing unit 501 is further configured to: determine a fifth access network device, and control the terminal device to establish an RRC connection to the fifth access network device.

The transceiver unit 502 may be further configured to receive an RRC connection release message sent by the second access network device or the fifth access network device.

When the first configuration information meets a first condition, the processing unit 501 may be further configured to discard the first configuration information. The first condition may be as described in step S403 in FIG. 4, and details are not described herein again.

The transceiver unit 502 may be further configured to receive second instruction information sent by the first access network device. The second instruction information instructs the terminal device to discard the first configuration information.

The transceiver unit 502 may be further configured to receive a second message sent by the first access network device. The second message includes updated first configuration information.

Other implementable functions, of the foregoing units, that are not described are the same as related functions in the communication method in the wireless network shown in FIG. 4, and details are not described herein again. Through collaboration and cooperation between the units, the terminal device can obtain the SRB configuration information of the second access network device and the trigger condition in advance. When the trigger condition is met, the terminal device uses the SRB configuration information of the second access network device to establish the RRC connection to the second access network device. This can speed up RRC connection restoration, and shorten a latency of restoring a dual-connectivity working mode. In addition, transmission is not interrupted in a dual-connection restoration process. Therefore, a low-latency requirement is met.

Figure 6:
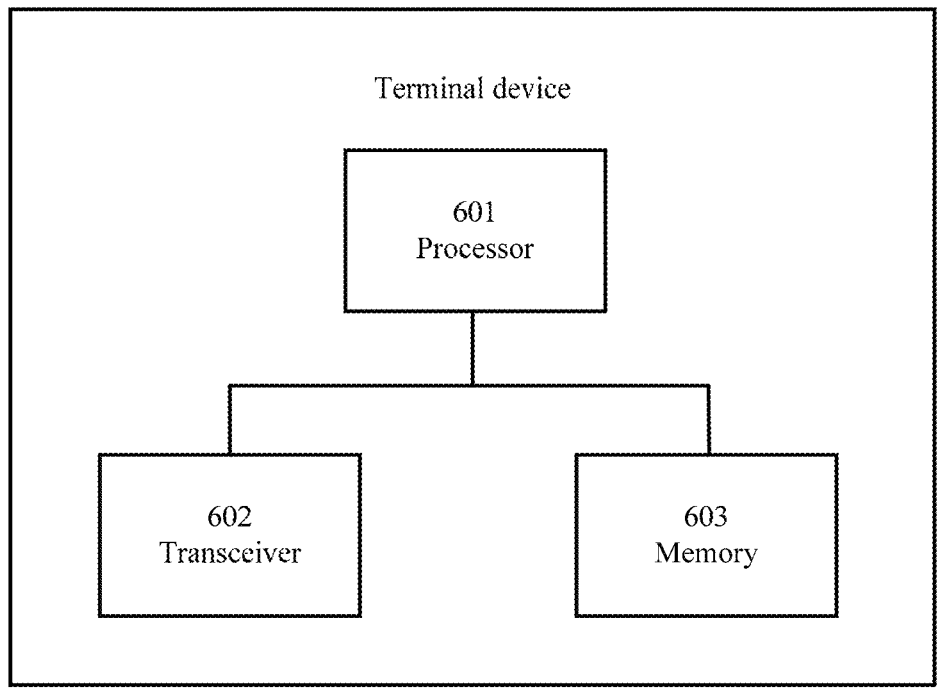
FIG. 6 is another possible schematic structural diagram of a terminal device according to an embodiment of the present invention.

FIG. 6 is a possible schematic structural diagram of the terminal device in the foregoing embodiments. The terminal device includes a processor 601 and a transceiver 602. The processing unit 501 described in FIG. 5 may be implemented by the processor 601, the transceiver unit 502 described in FIG. 5 may be implemented by the transceiver 602, and the transceiver 602 may be configured to support the terminal device in sending data to and receiving data from the network device in the foregoing embodiments. The terminal device may further include a memory 603, which may be configured to store program code and data of the terminal device. The components of the terminal device are coupled together, and are configured to support functions of the terminal device in the communication method in the wireless network described in FIG. 4.

It can be understood that FIG. 6 merely shows a simplified design of the terminal device. In an actual application, the terminal device may include any quantity of transceivers, processors, memories, and the like, and all terminal devices that can implement the embodiments of the present invention fall within the protection scope of the present invention.

Figure 7:
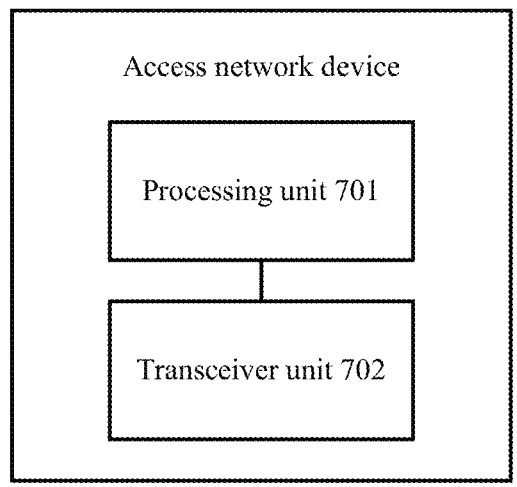
FIG. 7 is a possible schematic structural diagram of an access network device according to another embodiment of the present invention.

FIG. 7 is a possible schematic structural diagram of the access network device in the foregoing embodiments. It should be noted that the access network device can implement the method in the foregoing embodiments. Therefore, for specific details of the access network device, refer to the descriptions in the foregoing embodiments. For brevity, same content is not repeated in the following. The access network device may be the access network device 10 shown in FIG. 1. The access network device is a first access network device, that is, a master access network device in dual connections. The access network device includes a processing unit 701 and a transceiver unit 702.

The processing unit 701 is configured to control the access network device to establish an RRC connection to a terminal device by using the transceiver unit 702.

The RRC connection is one of the dual connections, and the dual connections further include a communication connection between the terminal device and a second access network device.

The transceiver unit 702 is configured to send first configuration information to the terminal device.

The first configuration information includes signaling radio bearer SRB configuration information of the second access network device and a trigger condition for using the SRB configuration information. The SRB configuration information of the second access network device is used by the terminal device to establish an RRC connection to the second access network device when the trigger condition is met.

The trigger condition may include the conditions described in step S402 in FIG. 4, and details are not described herein again.

Optionally, the first configuration information includes the random access configuration information, the measurement configuration information, the PDCP configuration information, the RLC mode information, the MAC layer logical channel configuration information, and the like described in step S402 shown in FIG. 4.

Further, as described in step S402 in FIG. 4, the SRB configuration information may include SRB0 configuration information of the second access network device, or SRB0 configuration information and SRB1 configuration information of the second access network device. An SRB type may be an SCG bearer or a split bearer.

The transceiver unit 702 may be further configured to send first instruction information to the terminal device. The first instruction information instructs the terminal device to use the SRB configuration information of the second access network device to establish the RRC connection to the second access network device.

The processing unit 701 may be further configured to set a predetermined time for the first configuration information. If the terminal device does not use the first configuration information within the predetermined time, the terminal device discards the first configuration information.

The transceiver unit 702 may be further configured to send second instruction information to the terminal device. The second instruction information instructs the terminal device to discard the first configuration information.

The transceiver unit 702 may be further configured to send a second message to the terminal device. The second message includes updated first configuration information.

Other implementable functions, of the foregoing units, that are not described are the same as related functions in the communication method in the wireless network shown in FIG. 4, and details are not described herein again. Through collaboration and cooperation between the units, the first access network device can send the SRB configuration information of the second access network device and the trigger condition to the terminal device in advance. In this way, when the trigger condition is met, the terminal device can use the SRB configuration information of the second access network device to quickly restore the RRC connection, thereby shortening a latency of restoring a dual-connectivity working mode. In addition, transmission is not interrupted in a dual-connection restoration process. Therefore, a low-latency requirement is met.

Figure 8:
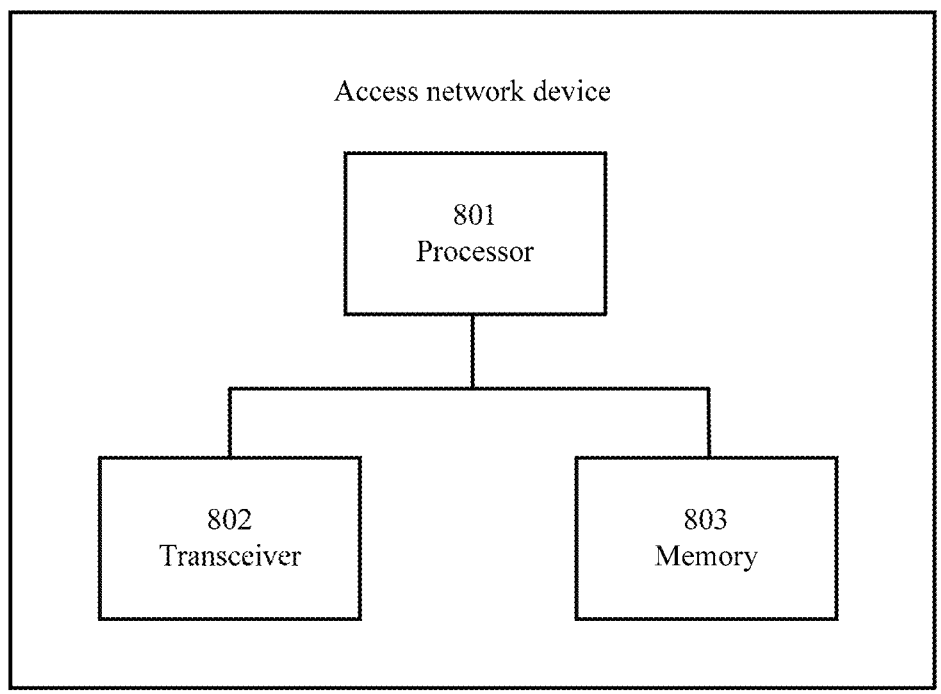
FIG. 8 is another possible schematic structural diagram of an access network device according to an embodiment of the present invention.

FIG. 8 is a possible schematic structural diagram of the access network device in the foregoing embodiments. The access network device includes a processor 801 and a transceiver 802. The processing unit 701 described in FIG. 7 may be implemented by the processor 801, the transceiver unit 702 described in FIG. 7 may be implemented by the transceiver 802, and the transceiver 802 may be configured to support the access network device in sending data to and receiving data from the terminal device in the foregoing embodiments. The access network device may further include a memory 803, which may be configured to store program code and data of the terminal device. The components of the access network device are coupled together, and are configured to support functions of the first access network device in the communication method in the wireless network in the embodiment described in FIG. 4.

It can be understood that FIG. 8 merely shows a simplified design of the access network device. In an actual application, the access network device may include any quantity of transceivers, processors, memories, and the like, and all access network devices that can implement the embodiments of the present invention fall within the protection scope of the present invention.

Figure 9:
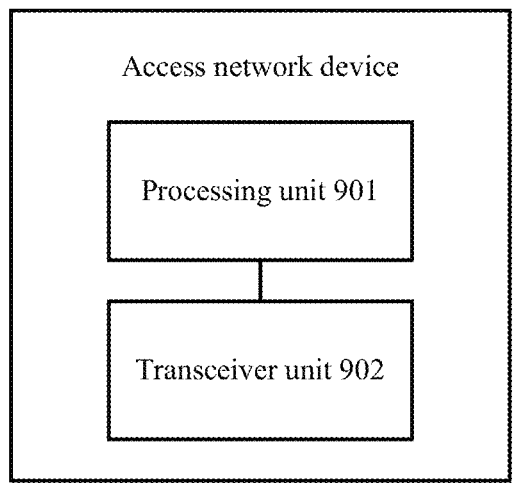
FIG. 9 is a possible schematic structural diagram of a network device according to another embodiment of the present invention.

FIG. 9 is a possible schematic structural diagram of the access network device in the foregoing embodiments. It should be noted that the access network device can implement the method in the foregoing embodiments. Therefore, for specific details of the access network device, refer to the descriptions in the foregoing embodiments. For brevity, same content is not repeated in the following. The access network device may be the access network device 20 shown in FIG. 1. The access network device is a second access network device, that is, a secondary access network device in dual connections. The access network device includes a processing unit 901 and a transceiver unit 902.

The processing unit 901 is configured to control the access network device to establish a communication connection to a terminal device by using the transceiver unit 902.

The communication connection is one of the dual connections. The dual connections further include an RRC connection between the terminal device and a first access network device.

The processing unit 901 is further configured to: when the trigger condition is met, control the second access network device to establish an RRC connection to the terminal device.

The RRC connection is established by using SRB configuration information of the second access network device.

The SRB configuration information of the second access network device and the trigger condition are sent by the first access network device to the terminal device by using first configuration information.

The trigger condition may include the conditions described in step S402 in FIG. 4, and details are not described herein again.

Optionally, the first configuration information includes the random access configuration information, the measurement configuration information, the PDCP configuration information, the RLC mode information, the MAC layer logical channel configuration information, and the like described in step S402 shown in FIG. 4.

Further, as described in step S402 in FIG. 4, the SRB configuration information may include SRB0 configuration information of the second access network device, or SRB0 configuration information and SRB1 configuration information of the second access network device. An SRB type may be an SCG bearer or a split bearer.

Optionally, the transceiver unit 902 is further configured to: send an addition request to a third access network device, and receive an addition request acknowledgement sent by the third access network device.

The processing unit 901 may be further configured to: configure the third access network device, and control the transceiver unit 902 to send a configuration complete message to the third access network device.

The transceiver unit 902 may be further configured to send second configuration information to the terminal device. The second configuration information includes configuration information of the third access network device. The second configuration information is used by the terminal device to establish a communication connection to the third access network device.

The processing unit 901 may be further configured to determine a fourth access network device.

The transceiver unit 902 may be further configured to send a first message to the terminal device. The first message includes identification information of the fourth access network device. The identification information of the fourth access network device is used by the terminal device to establish an RRC connection to the fourth access network device.

The transceiver unit 902 may be further configured to send an RRC connection release message to the terminal device.

Other implementable functions, of the foregoing units, that are not described are the same as related functions in the communication method in the wireless network shown in FIG. 4, and details are not described herein again. Through collaboration and cooperation between the units, when the trigger condition is met, the terminal device can use the SRB configuration information of the second access network device to quickly restore the RRC connection, and the second access network device changes to a master access network device and temporarily or permanently serves as the master access network device. This avoids transmission interruption in a dual-connection restoration process, and shortens a latency of restoring a dual-connectivity working mode, thereby meeting a low-latency requirement.

Figure 10:
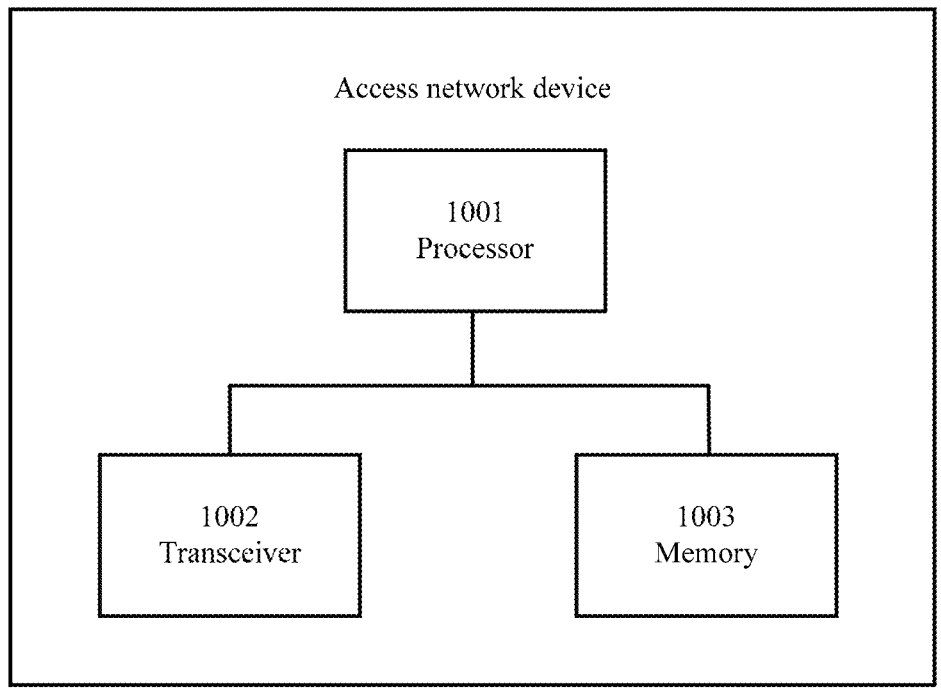
FIG. 10 is another possible schematic structural diagram of a network device according to an embodiment of the present invention.

FIG. 10 is a possible schematic structural diagram of the access network device in the foregoing embodiments. The access network device includes a processor 1001 and a transceiver 1002. The processing unit 901 described in FIG. 9 may be implemented by the processor 1001, the transceiver unit 902 described in FIG. 9 may be implemented by the transceiver 1002, and the transceiver 1002 may be configured to support the access network device in sending data to and receiving data from the terminal device in the foregoing embodiments. The access network device may further include a memory 1003, which may be configured to store program code and data of the terminal device. The components of the access network device are coupled together, and are configured to support functions of the second access network device in the communication method in the wireless network in the embodiment described in FIG. 4.

It can be understood that FIG. 10 merely shows a simplified design of the access network device. In an actual application, the access network device may include any quantity of transceivers, processors, memories, and the like, and all access network devices that can implement the embodiments of the present invention fall within the protection scope of the present invention.

It can be understood that the processor in the embodiments of the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination including one or more microprocessors, or a combination of a DSP and a microprocessor.

Steps of the methods or algorithms described in the embodiments of the present invention may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processing unit, so that the processing unit can read information from the storage medium, and store and write information into the storage medium. Optionally, the storage medium may be alternatively integrated into a processing unit. The processing unit and the storage medium may be disposed in an ASIC, and the ASIC may be disposed in a user terminal device. Optionally, the processing unit and the storage medium may be alternatively disposed in different components of a user terminal device.

A person skilled in the art should be aware that in the foregoing one or more examples, the foregoing functions described in the embodiments of the present invention may be implemented by hardware, software, firmware, or any combination thereof. If implemented in software, the functions may be stored in a computer readable medium, or transmitted to a computer readable medium in a form of one or more instructions or code. The computer readable medium includes a computer storage medium, and a communications medium that facilitates transferring of a computer program from one place to another place. The storage medium may be an available medium that can be accessed by any general or special computer. For example, such a computer readable medium may include but is not limited to a RAM, a ROM, an EEPROM, a CD-ROM or another compact disc storage, a magnetic disk storage or another magnetic storage apparatus, or any other medium that can be used to carry or store program code in a form of an instruction or a data structure, and program code in other forms that can be read by a general/special computer or a general/special processing unit. In addition, any connection may be appropriately defined as a computer readable medium. For example, if software is transmitted from a website, a server, or another remote resource by using a coaxial cable, an optical fiber computer, a twisted pair, or a digital subscriber line (DSL), or in a wireless manner such as infrared, radio, or microwave, the software is also included in a defined computer readable medium. The disc (disk) and disk (disc) include a compressed magnetic disk, a laser disk, a compact disc, a DVD, a floppy disk, and a Blu-ray disc. The disk usually copies data magnetically, and the disc usually copies data optically by using laser. The foregoing combination may also be included in the computer readable medium.

The objectives, technical solutions, and beneficial effects of the embodiments of the present invention are further described in detail in the foregoing specific implementations. It should be understood that the foregoing descriptions are merely specific implementations of the embodiments of the present invention, but are not intended to limit the protection scope of the embodiments of the present invention.

What is claimed is:

1. A communication method in a wireless network, the method comprising:
    establishing, by a terminal device, dual connections to a first access network device and a second access network device, wherein a connection that is between the terminal device and the first access network device and that is comprised in the dual connections is a radio resource control (RRC) connection;
    receiving, by the terminal device, first configuration information sent by the first access network device, wherein the first configuration information comprises signaling radio bearer (SRB) configuration information of the second access network device and a trigger condition for using the SRB configuration information;
    when the trigger condition is met, using, by the terminal device, the SRB configuration information of the second access network device to establish an RRC connection to the second access network device; and
    discarding, by the terminal device, the first configuration information based on the first configuration information meeting a first condition, wherein the first condition comprises at least one of the following conditions:
        the terminal device does not use the first configuration information within a predetermined time;
        the terminal device receives second instruction information sent by the first access network device, wherein the second instruction information instructs the terminal device to discard the first configuration information; or
        the terminal device receives a second message sent by the first access network device, wherein the second message comprises updated first configuration information.

2. The method according to claim 1, wherein the trigger condition comprises at least one of the following conditions:
    a radio link failure (RLF) occurs between the terminal device and the first access network device;
    quality of a radio link between the terminal device and the first access network device is lower than a first threshold;
    quality of a radio link between the terminal device and the second access network device is higher than a second threshold;
    the quality of the radio link between the terminal device and the second access network device is higher than a third threshold, and a value by which the quality of the radio link between the terminal device and the second access network device is higher than the quality of the radio link between the terminal device and the first access network device is greater than a fourth threshold;
    the quality of the radio link between the terminal device and the first access network device is lower than a fifth threshold, and the quality of the radio link between the terminal device and the second access network device is higher than a sixth threshold; or
    the quality of the radio link between the terminal device and the first access network device is lower than a seventh threshold, and the value by which the quality of the radio link between the terminal device and the second access network device is higher than the quality of the radio link between the terminal device and the first access network device is greater than an eighth threshold.

3. The method according to claim 1, wherein:
    the SRB configuration information comprises SRB0 configuration information, or
    the SRB information comprises SRB0 configuration information and SRB1 configuration information, or
    an SRB type is a secondary cell group (SCG) bearer or a split bearer.

4. The method according to claim 1, wherein the first configuration information further comprises random access configuration information, and wherein the random access configuration information is used by the terminal device to initiate a random access process for RRC connection establishment to the second access network device.

5. The method according to claim 1, wherein the first configuration information further comprises measurement configuration information, and wherein the measurement configuration information is used by the terminal device to determine whether the trigger condition is met based on a result obtained by performing measurement by using the measurement configuration information.

6. The method according to claim 1, wherein before the using, by the terminal device, the SRB configuration information of the second access network device to establish an RRC connection to the second access network device, the method further comprises:
    receiving, by the terminal device, first instruction information sent by the first access network device, wherein the first instruction information instructs the terminal device to use the SRB configuration information of the second access network device to establish the RRC connection to the second access network device.

7. The method according to claim 1, wherein the method further comprises:
    receiving, by the terminal device, second configuration information sent by the second access network device, wherein the second configuration information comprises configuration information of a third access network device; and
    using, by the terminal device, the configuration information of the third access network device to establish a communication connection to the third access network device.

8. The method according to claim 1, wherein the method further comprises:
receiving, by the terminal device, a first message sent by the second access network device, wherein the first message comprises identification information of a fourth access network device;
establishing, by the terminal device, an RRC connection to the fourth access network device based on the identification information of the fourth access network device; and
receiving, by the terminal device, an RRC connection release message sent by the second access network device or an RRC connection release message sent by the fourth access network device.

9. The method according to claim 1, wherein the method further comprises:
determining, by the terminal device, a fifth access network device;
establishing, by the terminal device, an RRC connection to the fifth access network device; and
receiving, by the terminal device, an RRC connection release message sent by the second access network device or an RRC connection release message sent by the fifth access network device.

10. A terminal device, the device comprising:
at least one processor;
a memory storing instructions executable by the at least one processor, wherein the instructions instruct the at least one processor to control the terminal device to establish dual connections to a first access network device and a second access network device, wherein a connection that is between the terminal device and the first access network device and that is comprised in the dual connections is a radio resource control (RRC) connection; and
a transceiver, configured to receive first configuration information sent by the first access network device, wherein the first configuration information comprises signaling radio bearer (SRB) configuration information of the second access network device and a trigger condition for using the SRB configuration information,
wherein when the trigger condition is met, the instructions further instruct the at least one processor to control the terminal device to use the SRB configuration information of the second access network device to establish an RRC connection to the second access network device; and
wherein the instructions further instruct the at least one processor to control the terminal device to discard the first configuration information based on the first configuration information meeting a first condition, and wherein the first condition comprises at least one of the following conditions:
the terminal device does not use the first configuration information within a predetermined time;
the terminal device receives second instruction information sent by the first access network device, wherein the second instruction information instructs the terminal device to discard the first configuration information; or
the terminal device receives a second message sent by the first access network device, wherein the second message comprises updated first configuration information.

11. The terminal device according to claim 10, wherein the trigger condition comprises at least one of the following conditions:

a radio link failure (RLF) occurs between the terminal device and the first access network device;
quality of a radio link between the terminal device and the first access network device is lower than a first threshold;
quality of a radio link between the terminal device and the second access network device is higher than a second threshold;
the quality of the radio link between the terminal device and the second access network device is higher than a third threshold, and a value by which the quality of the radio link between the terminal device and the second access network device is higher than the quality of the radio link between the terminal device and the first access network device is greater than a fourth threshold;
the quality of the radio link between the terminal device and the first access network device is lower than a fifth threshold, and the quality of the radio link between the terminal device and the second access network device is higher than a sixth threshold;
the quality of the radio link between the terminal device and the first access network device is lower than a seventh threshold, and the value by which the quality of the radio link between the terminal device and the second access network device is higher than the quality of the radio link between the terminal device and the first access network device is greater than an eighth threshold; or
the quality of the radio link between the terminal device and the first access network device is lower than a seventh threshold, and the value by which the quality of the radio link between the terminal device and the second access network device is higher than the quality of the radio link between the terminal device and the first access network device is greater than an eighth threshold.

12. The terminal device according to claim 10, wherein:
the SRB configuration information comprises SRB0 configuration information, or
the SRB configuration information comprises SRB0 configuration information and SRB1 configuration information, or
an SRB type is a secondary cell group SCG bearer or a split bearer.

13. The terminal device according to claim 10, wherein the first configuration information further comprises random access configuration information, and wherein the random access configuration information is used to control the terminal device to initiate a random access process for RRC connection establishment to the second access network device.

14. The terminal device according to claim 10, wherein the first configuration information further comprises measurement configuration information, and the measurement configuration information is used to determine whether the trigger condition is met based on a result obtained by performing measurement by using the measurement configuration information.

15. The terminal device according to claim 10, wherein before the instructions instruct the at least one processor to control the terminal device to use the SRB configuration information of the second access network device to establish the RRC connection to the second access network device, the transceiver is further configured to receive first instruction information sent by the first access network device, wherein the first instruction information instructs the terminal device to use the SRB configuration information of the second access network device to establish the RRC connection to the second access network device.

16. The terminal device according to claim 10, wherein:
the transceiver is further configured to receive second configuration information sent by the second access network device, wherein the second configuration information comprises configuration information of a third access network device; and
the instructions further instruct the at least one processor to control the terminal device to use the configuration information of the third access network device to establish a communication connection to the third access network device.

17. The terminal device according to claim 10, wherein:
the transceiver is further configured to receive a first message sent by the second access network device, wherein the first message comprises identification information of a fourth access network device;
the instructions further instruct the at least one processor to control, based on the identification information of the fourth access network device, the terminal device to establish an RRC connection to the fourth access network device; and
the transceiver is further configured to receive an RRC connection release message sent by the second access network device or an RRC connection release message sent by the fourth access network device.

18. The terminal device according to claim 10, wherein:
the instructions further instruct the at least one processor to:
determine a fifth access network device; and
control the terminal device to establish an RRC connection to the fifth access network device; and
the transceiver is further configured to receive an RRC connection release message sent by the second access network device or an RRC connection release message sent by the fifth access network device.

* * * * *